United States Patent [19]
Langhammer

[11] 3,964,897
[45] June 22, 1976

[54] METHOD AND ARRANGEMENT FOR MELTING CHARGES, PARTICULARLY FOR USE IN THE PRODUCTION OF STEEL

[75] Inventor: Hans-Juergen Langhammer, Bremen, Germany

[73] Assignee: Klockner-Werke AG, Duisburg, Germany

[22] Filed: Aug. 26, 1974

[21] Appl. No.: 500,662

Related U.S. Application Data

[63] Continuation-in-part of Ser. No. 337,736, March 2, 1973, Pat. No. 3,789,309, which is a continuation-in-part of Ser. No. 337,738, filed March 2, 1973, Pat. No. 3,894,864.

[30] Foreign Application Priority Data
Aug. 25, 1973 Germany............................ 2343051
Aug. 25, 1973 Germany............................ 2342947

[52] U.S. Cl. .................................. 75/10 R; 13/9 R; 75/44 S; 75/65 ZM
[51] Int. Cl.²........................ C22B 4/00; H05B 7/18
[58] Field of Search ................................. 75/10–12, 75/44 S, 65, 43; 13/9

[56] References Cited
UNITED STATES PATENTS
3,669,434  6/1972  Geck ................................... 75/44 S
3,788,837  1/1974  Geck ................................... 75/44 S

*Primary Examiner*—Peter D. Rosenberg
*Attorney, Agent, or Firm*—Michael J. Striker

[57] ABSTRACT

A charge consisting, for example, of scrap, and/or ore, pellets, sinter and the like, is admitted into a vertically arranged melting chamber and forms a column therein. The leading end of the column is melted with an electric arc which is preferably generated by means of a plurality of electrodes arranged circumferentially of the melting chamber so as to be of annular configuration. In this manner, a downwardly extending projection is formed within the confines of the periphery of the leading end of the column and this bears against the bottom of the melting chamber thereby supporting the column. If necessary, the charge may be reduced in the melting chamber prior to being melted. An outlet for the molten material is provided and may be located in the bottom of the chamber or in the wall of the chamber. In the former event, it is preferable for the outlet to be surrounded by a projection extending upwardly from the bottom of the chamber whereas, in the latter event, it is preferable for the outlet to be upwardly spaced from the bottom of the chamber. The reason is that such a construction is effective for permitting the molten material to remain on the bottom of the chamber for a short period prior to its outflow from the chamber so that the molten material is superheated by the electric arc. It is of advantage when the dimensions of the projection in the leading end of the column are maintained sufficiently small to prevent substantial heat transfer from the molten material to the column.

37 Claims, 3 Drawing Figures

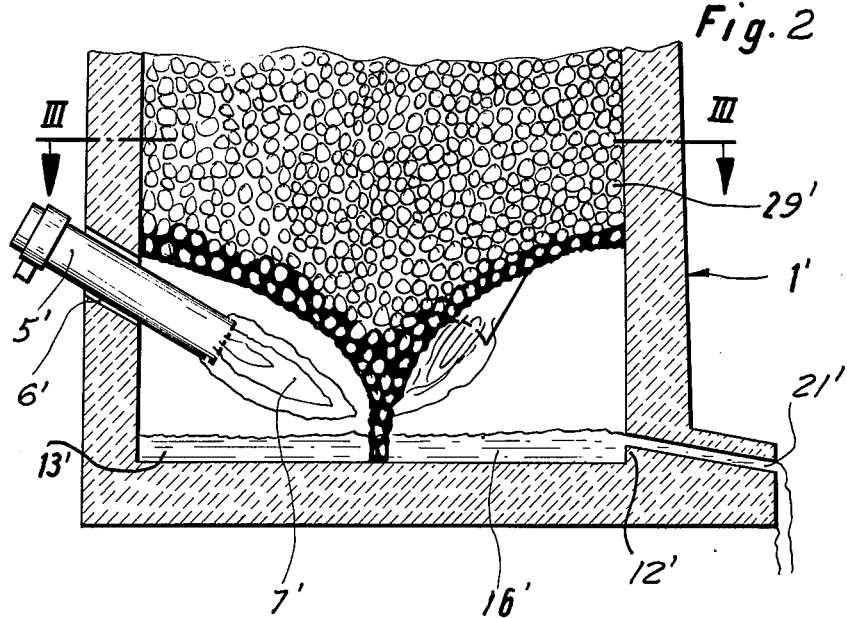
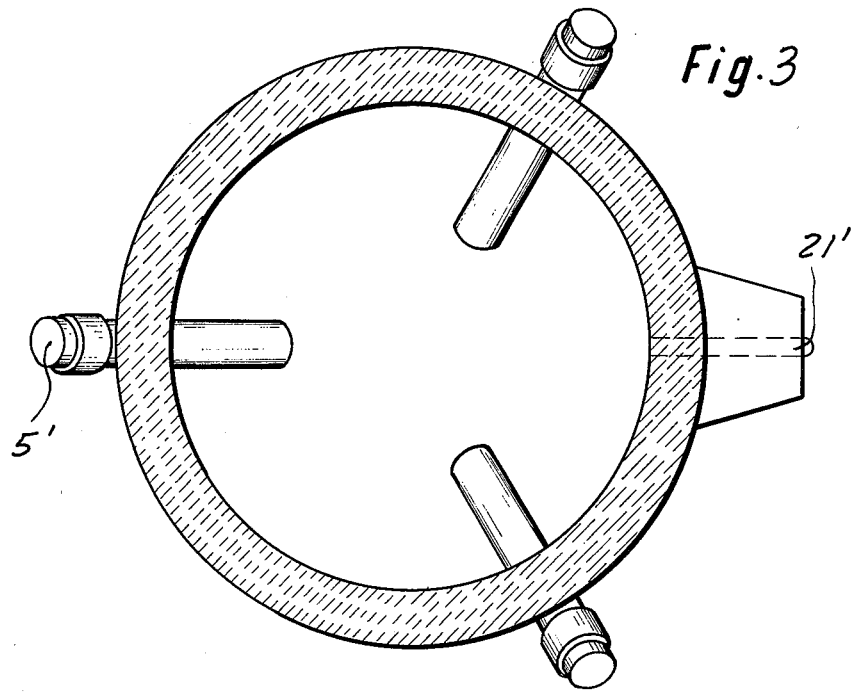

METHOD AND ARRANGEMENT FOR MELTING CHARGES, PARTICULARLY FOR USE IN THE PRODUCTION OF STEEL

CROSS-REFERENCE TO RELATED APPLICATIONS

This application is a continuation-in-part of my copending application Ser. No. 337,736 filed Mar. 2, 1973 and entitled "Smelting Process and Furance" now U.S. Pat. No. 3,789,309. This application is also a continuation-in-part of my copending application Ser. No. 337,738 filed Mar. 2, 1973 and entitled "Process and Apparatus for the Continuous Production of Steel from Ore."

BACKGROUND OF THE INVENTION

The invention relates generally to a method and arrangement for melting charges. Of special interest are a method and arrangement for use in the continuous production of steel.

The continuous melting of scrap, as well as the use of the counterflow principle, i.e. the principle by which reacting components move countercurrent to each other, have already long been practiced in blast furnace operation, particularly for the melting of ore and carbonaceous material so as to produce pig iron. The counterflow principle is advantageous since it produces the optimum reaction conditions by causing the reacting components to be intimately mixed thereby, in essence, causing a forcible alloying of the various constituents. However, blast furnace operation results in the production of pig iron which must then be further processed to produce steel. The cupola process, i.e., a process carried out in a cupola furnace, is also adaptable for continuous melting, even of scrap, as well as for the use of the counterflow principle, but only when the end product is to be pig iron such as foundry or casting pig iron.

In the production of pig iron, whether in a cupola furnace or a blast furnace, the coke serves simultaneously as a fuel, as an alloying agent and, above all, as a support structure or frame for the burden which is charged on top of it. As a result, the counterflow principle, and the attendant forcible alloying, are effective here since the gases generated by combustion of the coke flow upwardly through the burden while the burden moves downwardly so as to mix with the combustion products and produce pig iron. In this manner, pig iron may be produced in a continuous process. However, until now, no practical continuous melting process in shaft furnaces such as blast furnaces and cupola furnaces has been possible in the absence of coke, and the resultant absence of forcible alloying.

Insofar as the production of steel, as opposed to pig iron, is concerned, the production of steel from scrap is carried out almost exclusively in hearth-type furnaces using either the Siemens-Martin process or an electrolytic process. These processes, which have dominant until now, are discontinuous or batch-type processes which are carried out under unfavorable production conditions. The counterflow principle does not exist in these processes, the charging conditions are unfavorable and the processes utilize indirect heating. No possibility was seen heretofore for carrying over the superior operating principles used for the production of pig iron in the blast furnace to the direct production of steel.

It may be shown by semi-quantitative experiments that it is both technically possible and economically favorable to continuously melt a column or stack of scrap from the bottom. This melting process is carried out with the aid of the counterflow principle by using a plate-like burner flame formed by the combustion of oil and oxygen. The combustion gases rise as the scrap descends. Since the charge (primarily scrap) is partially oxidized during melting, it is necessary to perform an extra step after melting in order to have steel as the final product. This step involves carrying out an extraction reaction in the collecting vessel for the molten material, the extraction reaction being performed in the presence of pig iron or other carbonaceous material. It can be shown that this melting process has many advantages as regards energy and production considerations. However, this process also has the disadvantage that the scrap is unavoidably oxidized in the atmosphere of the flame during melting and, in order to avoid large losses of the material as slag, it is necessary to later cancel or reverse the oxidation in the collecting vessel for the molten material. This melting process corresponds exactly to that in conventional Siemens-Martin furnaces in this regard, since oxidation of the scrap by the combustion gases which occurs in the Siemens-Martin process must be compensated for by adding pig iron or coke to the charge. In contrast, the melting atmosphere in the electrolytic process is either a neutral or a reducing atmosphere so that there is no fear of oxidation.

A new process has been proposed in view of the above considerations wherein the technology of melting a stack of scrap from the bottom with a burner flame has been maintained. The surprising effect obtained is a result of the fact that the individual pieces of scrap in a descending stack of metallic scrap are welded to one another at their many points of contact under the influence of the melting heat. Thus, the stack, which in its upper region is composed of a multitude of individual pieces of scrap is, in its lower region, transformed into a rigid, fully welded iron structure or framework. This structure behaves like a solid body until it melts, that is, up to temperatures of over 1500°C. On the one hand, a cavity is formed in the lower surface of the welded structure due to melting of the material nearest the source of heat which cavity, however, does not cause the structure to cave in. On the other hand, the welded structure supports that portion of the charge which occupies the upper region of the stack. The stack formed by the scrap charged into the shaft of the furnace descends continuously along the shaft. Since the walls of the shaft are substantially smooth, the descent of the stack is unhindered by the walls and the descending stack melts layer by layer in the manner of a candle which is melted from the bottom.

This process is feasible only if the molten material flowing out of the melting chamber immediately flows into a vessel containing carbonaceous material, for example, in the form of pig iron, so that the molten iron oxide can react with the pig iron and convert the carbon therein to carbon dioxide gas. As a result of this reaction, wherein the oxygen in the molten iron oxide combines with the carbon in the pig iron to produce gaseous carbon dioxide, the iron oxide is converted into steel. In this manner, steel is produced in a two-stage process.

It is also known to make steel from ore, pellets, sinter and the like. Here, the ore or the pellets are converted to iron and sponge iron using reduction processes which come under the general heading "direct reduction processes." These processes are carried out in various types of apparatus. Best known is the direct reduction of coarse ores or of pellets in a shaft furnace and the direct reduction of fine ore and coal, for instance, coke, in a rotary furnace. The final product is sponge iron which usually has a residual content of non-reducible oxygen and contains in addition, as contaminants, gangue components of the ore which are not amendable to reduction.

The sponge iron is an intermediate product and is usually used in a second, independent operation where it constitutes, so to speak, the starting material for scrap iron in the conventional steel production apparatus. The high porosity, that is, large surface, of the sponge iron provides an unfavorable influence here since it causes a tendency for re-oxidation. As a result, extended unprotected storage, as well as melting under oxidizing conditions, have an undesirable effect.

For the latter reason, it is customary to melt down the sponge iron produced by direct reduction processes in electric furnaces. The sponge iron is preferably fed into the furnace continuously as distinguished from the conventional, discontinuous bucket-type charging. Again, steel is produced in a two-stage process.

It would be desirable if a manner of melting could be provided such as to make possible the production of steel in a single stage.

SUMMARY OF THE INVENTION

A general object of the invention is to provide a novel method and arrangement for melting charges.

Another object of the invention is to provide a method and arrangement for melting charges which enable charges to be melted at high throughput.

A further object of the invention is to provide a method and arrangement for melting charges which enable the production of steel from scrap to be accomplished in a single stage.

An additional object of the invention is to provide a method and arrangement for melting charges which enable the continuous production of steel from scrap to be realized.

It is also an object of the invention to provide a method and arrangement for melting charges which enable the production of steel from ore, pellets, sinter and the like to be accomplished in a single stage.

Still another object of the invention is to provide a method and arrangement for melting charges which enable the continuous production of steel from ore, pellets, sinter and the like to be realized.

A further object of the invention is to provide a method and arrangement for melting charges which enable the production of steel to take place under non-oxidizing conditions.

An additional object of the invention is to provide a method and arrangement for melting charges which enable the production of steel using the counterflow principle to be realized.

Yet another object of the invention is to provide a method and arrangement for melting charges which enable the production of steel using the principle of melting a charge from below to be realized.

In pursuance of these objects and of others which will become apparent hereinafter, the invention provides, in one of its aspects, a method of melting a charge wherein a charge is admitted into a substantially vertically arranged melting zone so as to form a column of the charge therein. The leading end of the column is melted by directing an electric arc at the leading end. Advantageously, the melting is performed in such a manner as to form in the leading end of the column a downwardly projecting portion located at least in part within the confines of the periphery of the leading end.

In accordance with another aspect of the invention, there is provided an arrangement for melting a charge which includes means defining a substantially vertically arranged melting chamber adapted to accommodate a column of charge. Electric arc generating means for melting the leading end of the column of charge is also provided. Advantageously, the electric arc generating means is arranged in such a manner as to form in the leading end of the column a downwardly projecting portion located at least in part within the confines of the periphery of the leading end.

Of special interest to the invention is the production, particularly the continuous production, of steel from scrap, e.g. scrap iron, and/or ore, e.g. iron ore, pellets, sinter and the like. Thus, although the principles of the invention may be applicable to other processes also, the invention will be illustrated herein with reference to the production of steel.

The melting zone or melting chamber may be in the form of a shaft furnace. The charge, e.g. scrap and/or ore, pellets, sinter and the like, may be introduced into the melting chamber at an upper region thereof so as to form a column of charge in the melting chamber and the charge may descend by gravity to a lower region of the melting chamber. The leading end of the descending column or charge is preferably melted in the lower region of the chamber. Since, in accordance with the invention, an electric arc is used for the melting operation, melting may take place under non-oxidizing conditions. The molten material resulting from the melting operation may be evacuated from the chamber and, prior to such evacuation, it is possible to superheat the molten material.

Depending upon the type of charge, it may be necessary or desirable to effect reduction of the charge prior to melting. This might, for example, be the case where the charge includes ore, pellets, sinter or the like. In such an event, a reducing gas may be introduced into the melting chamber so as to permit the charge to contact the reducing gas and be reduced thereby before melting occurs.

According to one embodiment of the invention, the electric arc is centrally located in the melting chamber. Here, the electric arc may have somewhat of a plate-shaped configuration. It is of advantage when the heat of the arc extends across most of the cross-section of the bottom portion or leading end of the column. In this way, the leading end of the column may be melted in such a manner as to cause the formation of a domed cavity the roof of which supports the charge as the column moves downwardly under the force of gravity.

According to another embodiment of the invention, the electric arc is substantially ring-shaped or annular. Advantageously, the electric arc has a substantially cutting torch-like configuration. It is again of advantage when the arc, or the heat of the arc, extends across the major part of the cross-section of the leading end of the column. Here, the leading end of the column may be melted in such a manner that a downwardly projecting portion is formed in the leading end which is at least partially located within the confines of the periphery of the leading end.

Another possibility, in accordance with the invention, is to use a combination of a centrally positioned, substantially plate-shaped electric arc with a substantially ring-shaped or annular electric arc.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a view similar to FIG. 1 through a lower portion of another form of an arrangement according to the invention which may be used for carrying out the method of the invention; and FIG. 3 is a view in the direction of the arrows III—III of FIG. 2.

DESCRIPTION OF THE PREFERRED EMBODIMENTS

Figure 1:
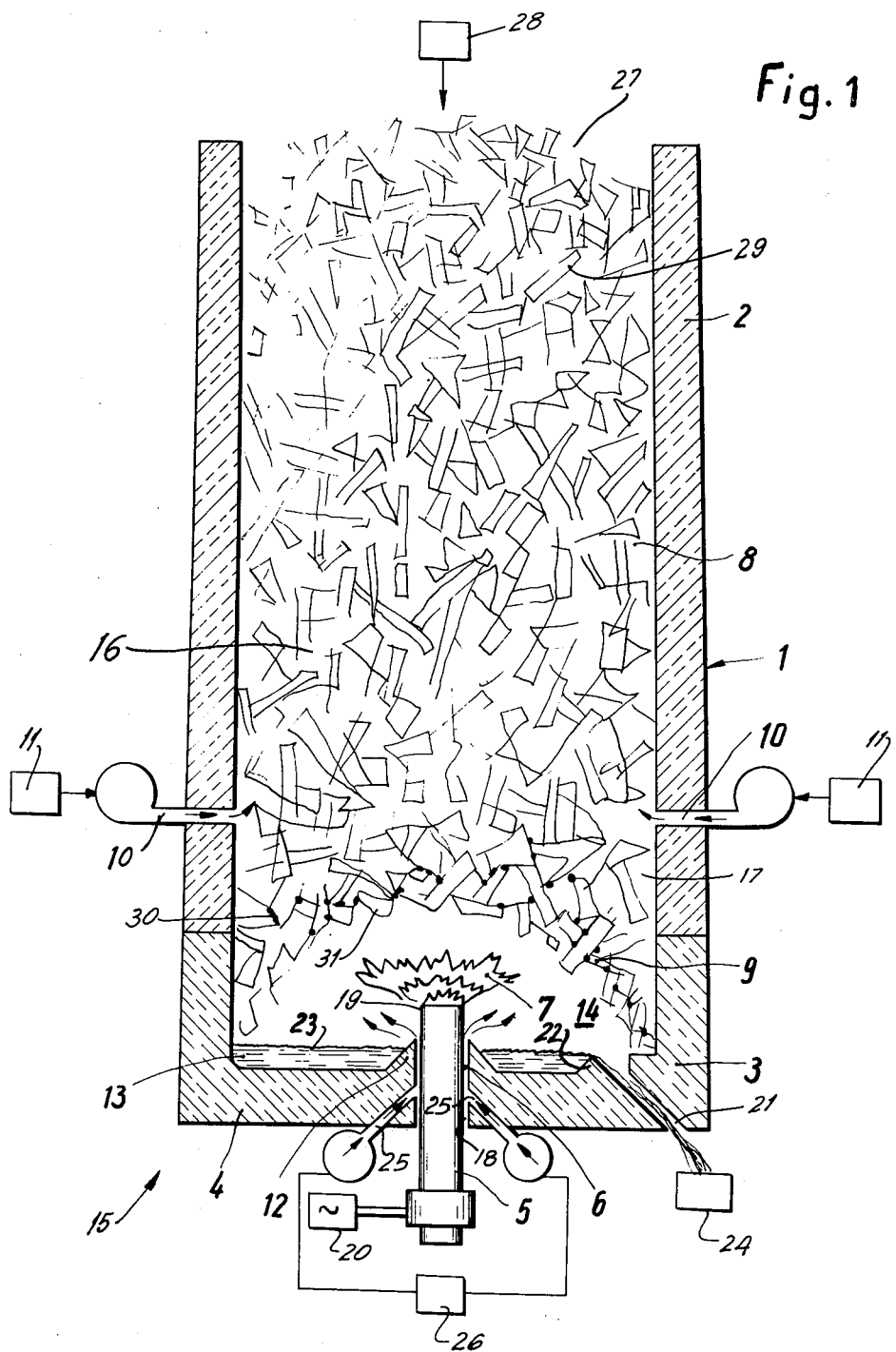
FIG. 1 is a diagrammatic vertical sectional view of one form of arrangement according to the invention which may be used for carrying out the method of the invention.

Referring to FIG. 1, a melting apparatus is shown generally at 15 and is here illustrated as being in the form of a shaft furnace. The apparatus 15 includes a wall 1 defining a melting zone or chamber 16. The chamber 16 preferably either has a uniform cross-section or widens somewhat in downward direction. Although the chamber 16 may have any appropriate cross-sectional configuration, it is preferred for the chamber 16 to be of substantially cylindrical configuration.

The chamber 16 comprises an upper portion or region 8 defined by the upper wall portion or section 2 and a lower portion or region 17 defined by the lower wall portion or section 3. A transverse or bottom wall, indicated at 4, is fast with the lower wall section 3. The wall sections 2 and 3, as well as the bottom wall 4, are all made of or coated with a heat-resistant or fire-resistant substance. Preferably, the lowermost part of the lower wall section 3, as well as the bottom wall 4, comprise a high-grade or heavy-duty heat-resistant or fire-resistant substance. It is preferred for the inner surfaces of the wall sections 2 and 3 to be substantially smooth and to contain no protuberances or depressions which may interfere with the descent of material through the chamber 16.

The heating or melting means for melting the material charged into the chamber 16 is here shown as being in the form of an electrode 5. The electrode 5 extends through an opening 18 provided in the bottom wall 4 so that the upper end portion or upper end 19 of the electrode 5 is located in the lower region 17 of the chamber 16. At its lower end, the electrode 5 is connected to a power source 20. The electrode 5 is so dimensioned with respect to the opening 18 that it fits in the opening 18 with clearance, as a result of which a preferably annular clearance space or passage 6 exists between the electrode 5 and the bottom wall 4. The electrode 5 is adjustable so that it may be moved up and down as desired. Preferably, the electrode 5 is centered in the chamber 16. Also, although the heating or melting means is here shown as being in the form of a single electrode 5, it is, of course, possible to provide a plurality of electrodes extending through the bottom wall 4. For example, it may be desirable in some cases to have three electrodes for melting the charge. When more than one electrode is used, it is preferable to distribute the electrodes symmetrically with respect to the cross-section of the chamber 16 although, in the final analysis, the distribution of the electrodes will be determined by the particular application. The power source 20 may be a direct current source or an alternating current source depending upon the number of electrodes and other conditions. In accordance with one aspect of the invention, an important consideration in selecting the melting means is that it be non-oxidizing and capable of operating in a non-oxidizing atmosphere, i.e. a neutral or reducing atmosphere.

The inner surface of the bottom wall 4 is provided with a protuberance or projection 12 which circumferentially surrounds the electrode 5 with clearance so that the passage 6 communicates with the lower region 17 of the chamber 16 at the top of the projection 12. By virtue of the projection 12, a collecting space 13 is formed in the lower region 17 of the chamber 16. The collecting space 13, which may be of annular configuration, collects the molten material and, because of the projection 12, contact between the molten material and the electrode 5 is prevented. In addition, the molten material is prevented from flowing into the passage 6 so that clogging of the latter is avoided. Evacuating means for evacuating the molten material from the chamber 16 is here shown as including an outlet passage 21 which, at one of its ends, communicates with the collecting space 13 or, in other words, with the lower region 17 of the chamber 16.

Near the outlet passage or tap hole 21, the inner surface of the bottom wall 4 is provided with another protuberance or projection 22 the top of which is at a lower level than the top of the projection 12 surrounding the electrode 5. In this manner, a pool of the molten material may always be maintained in the collecting space 13 while, at the same time, it is assured that the height or level 23 of the molten material is below the top of the projection 12 surrounding the electrode 5. The outlet passage 21 also communicates with a container 24 into which the molten material flows from the collecting space 13. In accordance with one aspect of the invention, it is important that the collecting space 13 communicate only with the container 24, that is, that the outlet passage or tap hole 21 and the connection to the container 24 be sealed against the effects of an exterior oxidizing atmosphere, in order to avoid oxidation of the molten material as it flows from the collecting space 13 to the container 24 and in order to insure that no oxygen enters the lower region 17 of the chamber 16. The projections 12 and 22 are preferably made of or coated with a high-grade or heavy-duty heat-resistant or fire-resistant substance such as a refractory material.

It may be seen that, in accordance with an advantageous embodiment of the invention, it is contemplated for the outlet passage or tap hole 21 to be in an area which is exposed to the heat of the electric arc. The height of the projection 22 will determine the depth of the sump or basin, that is, the depth of the collecting space 13, for the molten material at the bottom of the chamber 16 and, hence, the residence time of the molten material and the amount of heating exposure may be adjusted as desired by changing the height of the projection 22.

Admitting means is provided for admitting at least one stream of a gaseous substance into the lower region 17 of the chamber 16. The admitting means includes at least one inlet passage 25 which, at one of its ends, communicates with the opening 18 in the bottom wall 4 or, in other words, with the passage 6, and at the other of its ends communicates with a source 26 of a gaseous substance. Valve means may be provided for controlling the rate at which the gaseous substance enters the lower region 17 of the chamber 16. From the inlet passage 25, the gaseous substance flows into and through the passage 6 to enter the lower region 17 of the chamber 16 and thence flows upwardly towards the upper region 8 of the chamber 16. The gaseous substance is preferably free of oxygen since one of the purposes thereof is to aid in maintaining a non-oxidizing atmosphere in the lower region 17 of the chamber 16. The gaseous substance flowing out of the passage 6 is heated by the electric arc 7 generated by the electrode 5 so that, as it rises through the chamber 16, the gaseous substance is able to transmit heat to the charge by convection. The gaseous substance may be introduced into the lower region 17 of the chamber 16 in any suitable manner, for example, by pumping or blowing in the gaseous substance or by allowing the gaseous substance to enter by aspiration.

There is further provided additional admitting means for admitting at least one current of the same or another gaseous substance into the upper region 8 of the chamber 16. This admitting means comprises at least one duct 10 which, at one of its ends, communicates with the upper region 8 of the chamber 16 and, at the other of its ends, may communicate with a suitable source 11 of a gaseous substance. Valve means may be provided for controlling the rate at which the gaseous substance enters the upper region 8 of the chamber 16. The gaseous substance may aspirate into the upper region of the chamber 16 or may be forcibly introduced therein by pump means or blower means. It may be seen that the gaseous substance here enters the chamber 16 at a peripheral portion of the upper region 8 thereof and, in the embodiment shown, the entering gaseous substance flows in a direction substantially normal to the longitudinal direction of the chamber 16. However, it is also possible for the inlet duct 10 to be slanted so that the gaseous substance enters the upper region 8 of the chamber 16 with an upward component of flow.

There are instances in which a reduction of the charge is not necessary, for example, when the charge consists of scrap such as scrap iron. In such an event, the source 26 may be a source of fuel and the admitting means which includes the inlet passages 25 may consitute fuel admitting means. Thus, at least one stream of fuel would here be admitted into the lower region 17 of the chamber 16 via the passage 6. The term fuel as used herein includes fossil fuels. Suitable fuels include natural gas, by-product coke-oven gas, blue-water gas, oil and other corresponding gaseous or gasified combustible materials. On the other hand, the admitting means which includes the inlet ducts 10 may, in such an event, constitute air admitting means. The term air as used herein includes oxygen or any suitable gaseous or gasified substance containing oxygen. The source 11 would then constitute a source of air although it is also possible here to eliminate the source 11 and to have the inlet ducts 10 communicate directly with the atmosphere. The air is preferably not permitted to enter the lower region 17 of the chamber 16 in order that a non-oxidizing atmosphere be maintained therein. The fuel flowing upwardly from the lower region 17 of the chamber 16 will force the air to flow upwardly and thereby insures that no air enters the lower region 17. Thus, the lower region 17 is that portion of the chamber 16 located below the inlet duct 10 whereas the upper region 8 is that portion of the chamber 16 extending upwardly from the inlet duct 10. The fuel and air mix and combust in the upper region 8 of the chamber 16 and the heat of combustion serves to preheat the charge. The combustion gases may be removed from the chamber 16 in any conventional manner. For example, suitable suction means such as an exhaust fan may be provided for removing the combustion gases or the combustion gases may escape directly to the atmosphere.

There are further instances where a reduction of the charge may be desirable or necessary, for example, when the charge includes pellets, sinter and/or ore such as iron ore. In such an event, different possibilities exist. One embodiment of the invention provides for the introduction of reducing gas into the chamber 16 with part of the reducing gas being admitted to the column of charge peripherally and with part of the reducing gas being admitted directly into the melting cavity which forms during the process so that the latter part of the reducing gas is subjected to additional heating. In accordance with this embodiment of the invention, the source 26 and the source 11 constitute sources of reducing gas or reducing fuel so that reducing gas is admitted directly into the lower region 17 of the chamber 16 via the passage 6 and reducing gas is also admitted into the chamber 16 via the inlet ducts 10. By introducing part of the reducing gas and/or fuel from outside in a peripheral direction and introducing part of the reducing gas directly into the melt cavity, which forms in the vicinity of the lower region 17 of the chamber 16, it becomes possible to heat the reducing gas directly or indirectly by the heat of the electric arc 7. The quantity of heat thus absorbed is then passed on to the upper portions of the column of charge and is taken up in the reduction process. Another embodiment of the invention contemplates sealing of the apparatus and maintaining a reducing atmosphere by introducing additional reducing gas, or an inert gas, into the lower region 17 of the chamber 16 via the passage 6.

The introduction of reducing gas or, if desired, an inert gas, into the lower region 17 of the chamber 16 via the passage 6 has certain desirable effects. Thus, it affords protection for the electrode 5 against molten material splattering from above. Moreover, this helps in maintaining the reducing atmosphere, particularly since the chimney effect of the apparatus 15 provides, by itself, an efficient sealing effect against the entry of exterior air.

Suitable charging means introduces the charge into the upper region 8 of the chamber 16. The charging means comprises a material inlet 27 and, in the embodiment illustrated wherein the chamber 16 has an upper open end, the material inlet 27 is constituted by this upper open end. The charge comes from a source 28 of material, and regulating means such as a suitable charging device may be provided for controlling the rate of entry of the charge into the upper region 8 of the chamber 16. The charge descends by gravity in the chamber 16 from the upper region 8 to the lower region 17, the descent of the charge being unhindered by virtue of the fact that the inner surface of the wall 1 is substantially smooth. The charge may include, in addition to the scrap and/or the ore, pellets, sinter and the like or other material, the alloying elements or components required for the steel and, when such alloying elements are included in the charge, it is preferable to have them homogeneously distributed throughout the charge. The charge may also include any other conventional additive which may be required.

In operation, the charge, which includes many discrete pieces of material, is introduced into the upper region 8 of the chamber 16 through the material inlet 27. As just indicated, the charging step may include homogeneously mixing the alloying elements for the steel with the other material forming the charge and, in a preferred embodiment of the invention, all of the alloy components which are necessary for the final steel composition are added uniformly and continuously during the process. Furthermore, the limestone for the gangue, or the coal or coke for the alloy or for the reduction step (where this is performed), as well as reducible alloy oxides, may likewise be introduced in a continuous and uniform manner during the entire process. The charge descends continuously by gravity from the upper region 8 to the lower region 17 of the chamber 16 and forms a stack or column 29 which extends from the upper region 8 to the lower region 17 of the chamber 16. Charging of the chamber 16 may, for instance, be accomplished with the help of a charging band or conveyor.

Considering first a case where reduction of the charge is not required, fuel is admitted into the lower region 17 of the chamber 16 via the passage 6 so as to establish and maintain a non-oxidizing atmospher in the lower region 17. Preferably, the fuel is a reducing gas. The fuel entering the lower region 17 of the chamber 16 flows upwardly in a direction countercurrent to the direction of movement of the charge. Air is admitted into the upper region 8 of the chamber 16 and is forced to flow upwardly under the influence of the upwardly flowing fuel. Since the charge is not a solid mass but includes many discrete pieces which do not pack together too closely, a large number of interstices or spaces exist in the stack 29 so that the fuel and air are free to flow upwardly through the chamber 16.

The fuel and air mix and combust in the upper region 8 of the chamber 16 so as to preheat at least the lower end portion or leading end 30 of the stack 29, i.e. so as to preheat at least that portion of the charge which is located in the lower region 17 of the chamber 16 or, in other words, at least that portion of the charge which is located in the region where melting occurs. It is advantageous to preheat to a temperature between about 800° and 1000°C.

Considering next a case where reduction of the charge is desired, a reducing gas such as, for instance, natural gas, is admitted into the lower region 17 of the chamber 16 via the passage 6. This gas flows upwardly through the chamber 16 countercurrent to the direction of movement of the charge. Further reducing gas such as, for example, natural gas, is admitted into the stack 29 through the inlet ducts 10. If the charge includes ore, for instance, the ore is thus converted into sponge iron. This conversion may take place in the lower part of the stack 29, that is, in the part thereof which is opposite the electric arc 7.

In either case, power is supplied to the electrode 5 from the power source 20 so that the electric arc 7 is struck between the upper end 19 of the electrode 5 and the lower surface or face 31 of the stack 29. The gas which flows through the passage 6 located between the bottom wall 4 and the electrode 5 enters the lower region 17 of the chamber 16 in the vicinity of the arc 7. Thus, the gas is heated by the arc 7 and, as a result of the fact that the gas flows countercurrent to the charge, the gas is able to convey the latent heat of the arc 7 to the stack 29 by convection.

The electrode 5 is preferably so adjusted that the arc 7 plays over the major portion of the cross-section of the face 31 and is centered with respect to this cross-section. In other words, it is preferable for the arc 7 to play over the center portion of the face 31 but not over the peripheral portion of the face 31. The arc 7 melts the charge forming the stack 29 in such a manner that a cavity or melting space 14 is formed in the vicinity of the arc 7. In the illustrated embodiment, the stack 29 is burned out in such a manner under the action of the heat of the arc 7 that the cavity 14 is of dome-shaped configuration. This is a result of the fact that the effect of the arc 7 extends for a certain distance in all directions around the arc 7 so that the face 31 of the stack 29 takes on an arcuate form or becomes substantially part-spherical. The cavity 14 forms of itself by virtue of the fact that the stack 29 is heated from below so that, at any time, only the charge in the lowermost portion of the stack 29 is being melted. The surface of the dome, that is, the face 31 of the stack 29, is then subject to gradual melting in the form of an inverted bowl and continuously re-forms by virtue of the downwardly moving charge of the stack 29, which charge is caused to move by the force of gravity.

Due to heat conduction within the stack 29, and due to the heat carried by the flue gases flowing in the chamber 16, the stack 29 becomes preheated to such an extent in the vicinity of the cavity 14 that the individual pieces of material forming the stack 29 weld to one another at many points of contact and thereby form a strong support frame or structure for the charge in the upper portion of the stack 29. This effect occurs under the action of the downwardly increasing temperature in the chamber 16. The support structure formed at the lower end of the stack 29, which is here of arch-shaped or vault design, has sufficient strength to support the charge lying thereabove and to continuously reform itself. It may be mentioned that, if the charge includes ore which is subjected to reduction in the chamber 16, the material in the vicinity of the lower end of the stack 29 will include sponge iron particles. Here, the sponge iron particles in the reduction zone directly above the bottom portion of the stack 29 may be gradually welded together at their multiple points of contact prior to becoming molten so as to form a firm support structure for the charge in the upper portion of the stack 29.

The entire stack 29 itself rests upon or is supported by the relatively small, ring-like edge portion or rim 9 forming part of the face 31 of the stack 29. The rim 9 is continuously being consumed by the molten material which has entered and formed a pool in the collecting space 13. As a result, the charge descends continuously through the chamber 16 and fresh charge is being continuously exposed to the arc 7. Although at least portions of the marginal section or edges of the stack 29 may be in contact with the wall 1, the charge is still able to descend unhindered, that is, with a uniform and continuous movement, since the inner surface of the wall 1 is substantially smooth. Thus, by continuously melting the stack 29 from below, the above-described mechanism is operative and the support frame or structure is continuously renewed while fresh charge is continuously exposed to the action of the arc 7. Also, since the molten material flows downwardly into the collecting space 13, the interstices between the individual pieces of material forming the stack 29 remain completely unobstructed so that the gases flowing countercurrent to the charge are able to flow freely and convey heat to the stack 29.

The arc 7 may serve not only for melting the charge but may also serve to superheat the molten material. The molten material collects in the collecting space 13 and forms a pool on the inner surface of the bottom wall 4 having a liquid level 23. Since the molten material enters the pool prior to evacuation from the chamber 16, the dwell time of the molten material in the chamber 16 is increased. Furthermore, since the collecting space 13 in which the pool is formed lies in the vicinity of the arc 7, the pool of molten material is exposed to the heat generated by the arc 7. As a result, the molten material remains superheated for a longer time than if it were directly evacuated from the chamber 16. This facilitates removal of the molten material from the chamber 16. In this regard, it is advantageous, as mentioned earlier, for the outlet passage 21 to be located in the vicinity of the arc 7 so that the full effect of the superheating may be realized. If the outlet passage 21 were located too far from the arc 7, the molten material would cool significantly before reaching the outlet passage 21 and the super-heating effect would be lost thereby increasing the difficulty of evacuating the molten material.

The following Example, which relates to a process wherein reduction of the charge is effected, is intended to further illustrate the invention and is not to be considered as limiting the invention in any manner.

EXAMPLE

In order to perform the method according to the invention wherein reduction of the charge is effected, ore in the form of pellets is used in the present illustration. The ore has a metallic iron content of 67.9 percent and consists of 96 percent $Fe_2O_3$, 4 percent $SiO_2$ and impurities. The column of ore is preheated to 900°C by means of hot reducing gas. The reducing gas consists of 49.2 percent $H_2$, 43.6 percent CO, 1.2 percent $CO_2$, 1.2 percent $H_2O$, 2.3 percent $CH_4$ and 2.3 percent $N_2$. By means of this reducing gas, the ore is reduced to sponge iron consisting of 94.8 percent metallic iron, 1.35 percent $SiO_2$, 3.85 percent $O_2$ and impurities.

For the production of 1000 kilograms of metallic iron, 1396 kilograms of ore (pellets), 50 kilograms of lime and 1530 $Nm^3$ of reducing gas are required. A shaft furnace is used in the present illustration and 20 percent of the reducing gas is admitted into the shaft furnace through the passage 6 formed about the electrode 5. The energy necessary for heating from 900° to 1600°C and for melting amounts to 268 kWh per metric ton of metallic iron as based on a thermal efficiency of 85 percent. For the production of 20 metric tons of steel per hour, 27,920 kilograms of ore and an electrical energy of 5494 kWh are required as well as a transformer having a power output of at least 5.77 MW.

The shaft furnace has an inner diameter of 2.5 meters. The height of the reduction zone is 8 meters while the melting zone has a height of 2 meters. The molten material forms a bath having a depth of 200 millimeters. The liquid material produced by melting of the pellets must be alloyed in order to obtain a steel composition of 0.15 percent carbon, 0.60 percent manganese, 0.20 percent silicon and 0.03 percent aluminum. The alloying additions used per metric ton of steel are as follows:

0.7 kilograms of coal;

3 kilograms of FeSi having an Si content of 75 percent;

7.8 kilograms of FeMn having an Mn content of 80 percent and containing 7 percent carbon; and 1.7 kilograms of Al.

Thus, the invention provides a melting method and arrangement which enables the continuous production of steel from scrap and/or ore, pellets, sinter and the like to be realized. The arrangement may include a melting apparatus which is in the form of a shaft-type furnace and the melting zone preferably either has a substantially uniform cross-section or widens somewhat in downward direction. However, it will be understood that an important criterion for the melting zone resides in that the charge be able to descend continuously through the melting zone.

With respect to the case where reduction of the charge need not be effected, although the atmosphere in the upper region of the melting zone, wherein combustion of fuel and air may take place, may be an oxidizing atmosphere, the atmosphere in the lower region of the melting zone may be a non-oxidizing atmosphere. As a result, scrap iron charged into the melting zone may continuously be converted into steel in a single-stage operation. As is the case when melting with a petroleum-oxygen burner, the method of the invention, wherein an electrode is used instead of a burner, may result in a melting space being formed near the lower end of the stack. As is also the case when using a petroleum-oxygen burner, the stack may be melted in a shell-like manner from the bottom, i.e. as one layer of the stack melts, a fresh layer is exposed to be melted. However, in the method of the invention, it is possible to avoid oxidation of the charge as a result of the heat generated during melting. In this regard, the product produced by the method of the invention is equivalent to that produced in a process wherein the material has undergone a purifying remelting operation in a neutral or reducing atmosphere in order to obtain the final product. Where clean scrap was used in the method of the invention, i.e. where the scrap used has been trimmed, internally circulated etc., practically finished steel was obtained in the collecting vessel. Where worse qualitites of scrap were used, the non-combustible metallic impurities (Cu, Sn, etc.) present in the scrap were melted together with the scrap as is the case in the known electrolytic process. Also, by using the method of the invention, alloying additions may be charged directly, together with the scrap, and practically no loss of these alloying additions will occur. This, of course, applies as well to the carbon required for obtaining the desired carbon content in the steel. Moreover, in the continuous melting process of the invention, the heating conditions, such as the heat transfer conditions, may always be the optimum conditions. Even more favorable conditions may be obtained when only part of the energy required for melting is supplied by relatively expensive electrical energy. Thus, it is advantageous to heat the charge, by means of cheaper fossil fuels, to temperatures between 800° and 1000°C, i.e. to temperatures at which the tendency for oxidation by the oxidizing burner flame is still low. In accordance with the invention, this favorable effect may be obtained by preheating the stack of charge with natural gas, by-product coke-oven or blue-water gas, oil or corresponding gaseous or gasified combustible substances which flow counter-current to the descending charge, and then melting the thus-preheated charge by means of a reducing electric arc. The combustible gases, which are preferably free of oxygen, may be admitted into the melting chamber from below the stack of charge so that, on the one hand, the reducing atmosphere existing in the region where melting occurs is maintained while, on the other hand, the latent heat of the electric arc picked up by the flowing gases may be conveyed to the charge. The air required for combustion may be admitted into the melting chamber through the walls thereof and above the region where melting occurs so that the atmosphere created by combustion of the fuel and air does not penetrate into this region. As a result of the relatively large volume of interstices existing in a stack of charge, thorough mixing of the combustible gases with the air admitted at the marginal sections of the stack will occur by virtue of the chimney effect existing in the melting chamber. The mixing of the combustible gases with the air may also be influenced by lengthening the flow path of the gases in longer melting chambers.

With respect to the case where reduction of the charge is effected, the invention permits melting of the sponge iron and conversion into steel to be achieved in the same melting chamber, e.g. shaft furnace, in which the sponge iron has been made from the original ore. The invention permits the two stage process consisting of a reduction stage and a completely separate melting and steel conversion stage to be avoided and enables the melting process, which is presently carried out discontinuously, to be effected in a continuous manner. The method of the invention makes it possible to realize considerable savings as regards heat supply and energy because the usual cooling down of the sponge iron from the temperature of the reduction stage and the subsequent reheating to the temperature of the melting stage may be eliminated. Melting may be carried out after reduction in one and the same process and without any intermediate cooling between the two operations. Moreover, re-oxidation may be avoided by melting the sponge iron under reducing conditions immediately after reduction. Furthermore, all apparatus for supplying iron ore to the reduction stage and for discharging sponge iron from the latter and transferring it to the melting stage may be dispensed with. In addition, all additives required for the final steel composition may be added simultaneously with the ore and such additives may even, in part, be supplied in the form of oxides. It is also possible, in the method of the invention, to interrelate the melt performance, that is, the supply of heat by means of a specific amount of electrical energy, with the quantity of reducing gas introduced.

Generally speaking, the heating conditions in the method of the invention may always be optimum. The continuous operation and the envelopment of the heat source by the melting material enable ideal heat transfer conditions to be achieved which, contrary to the discontinuous steel production processes, do not deteriorate during the course of conversion of a particular charge. This enables the comparatively high heating efficiency of about 70 percent obtained in the discontinuous melting processes using electric furnaces to be increased to above 90 percent when using the continuous operation of the invention. Such an increase in the heating efficiency may be realized because it becomes possible, when proceeding in accordance with the invention, to insure that the only heat losses will occur through the wall of the melting chamber, and even these heat losses may be substantially reduced or avoided by using sufficient insulating material. The heat generated by the electric arc may be used only for heating and melting the charge and for superheating the molten material so as to facilitate evacuation thereof, that is, little heat need be wasted or lost. Consequently, the production and thermal efficiency may be high and the continuous operation according to the invention may result in a high output relative to the surface area of the hearth or to the total volume of the melting chamber so that, as compared with the conventional discontinuous steel production processes, only comparatively small melting chambers, e.g. furnaces, are required. Hence, reduced investment and maintenance costs may be realized.

Also, contrary to conventional steel production processes such as, for instances, the known, discontinuous electrolytic processes, substantial savings are possible as regards the refractory lining of the melting chamber. The molten material which flows down from the stack or column and accumulates at the bottom of the melting chamber is able to constitute a protective covering for the bottom wall of the melting chamber while the stack or column itself is able to protect the side walls. Thus, the heat-resistant or fire-resistant substance coated on or forming the walls of the melting chamber may be ideally protected and the frequency with which the walls of the melting chamber must be repaired or re-lined may be low. Only the projection around the electrode need be directly exposed to the heat of the electric arc and all other refractory portions of the melting chamber may be protected against excessive heating by means of either molten or solid material. It therefore becomes further possible to make only the bottom portion of the melting chamber from high-quality refractory material. For instance, with respect to the case where reduction of the charge is effected, all other portions of the melting chamber need withstand only the comparatively low temperatures attendant to the reducing gas. This means that the larger part of the melting chamber may be formed of fire-clay type materials while only the lowermost portion thereof need be made of basic magnesite or dolomite, or of an acidic refractory which has a high alumina content. Thus, in the arrangement according to the invention, only the lowermost portion of the melting chamber, e.g. only the lowermost portion of the shaft of a shaft furnace, which is directly exposed to the heat of the electric arc, need be lined with or formed of high-quality refractory material. The remainder need be lined with or formed of regular refractories only.

A further advantage of the invention resides in that it becomes possible to superheat the molten material. Thus, if the molten material were to have a temperature which is only slightly higher than its liquidus temperature, then disadvantageous effects could arise when it is desired to transport the molten material from the melting chamber to a converter, a Siemens-Martin oven or the like. Moreover, this could lead to blockage of the outlet opening or openings of the melting chamber by molten material which has solidified, particularly when it is desired to further process the molten material in a discontinuous operation so that the melting procedure must be interrupted. By making it possible for the molten material to be superheated and, resultantly, enabling the molten material to be heated to a temperature which is relatively far above its liquidus temperature, the invention permits freezing of the molten material in the melting chamber, as well as in the outlets of the latter, to be prevented.

It is noteworthy that the invention does not require coke in order to form a support frame or structure for the charge.

It will be appreciated that the invention is not limited to the conversion of scrap iron and/or ore, pellets, sinter and the like into steel but is also applicable to the production of other metals and alloys from scrap and ore. In general, the invention may find applicability in processes involving melting operations.

Although the embodiment of the invention illustrated in FIG. 1 provides very favorable results, even further improvements are possible. In the embodiment shown in FIG. 1, an electrode is illustrated which is centrally positioned, that is, which is located on the longitudinal axis of a vertically arranged melting chamber, and the electric arc generated by the electrode has somewhat of a plate-shaped configuration. A plate-shaped arc which is generated by a centrally positioned electrode, however, prossesses the disadvantage that its diameter cannot be increased as desired so that, when the melting chamber is of large cross-section, it may not be possible for the column of charge to be impinged by the arc over the major part of its cross-section. In this connection, it may be seen that large cross-sections for the melting chamber are of importance for increasing the throughput capacity. Furthermore, melting chambers of large cross-section make it possible to charge bulky types of scrap which do not require much preparation prior to being charged since the size of the charging opening of the melting chamber may then be increased correspondingly.

Thus, according to a further embodiment of the invention, there is provided a method of melting a charge wherein the leading end of a column of charge is melted in such a manner as to form in the leading end a downwardly projecting portion located at least in part within the confines of the periphery of the leading end. This embodiment of the invention enables an even higher throughput to be achieved.

Again, the melting chamber and, consequently, the column of charge, are preferably of at least approximately constant cross-section and it is favorable when the electric arc extends across the major part of the cross-section of the column or the leading end thereof. As in the previously described embodiment, it is further of advantage for the arc to be positioned so far above the bottom of the melting chamber that the molten material which flows off is able to form a thermal barrier or thermal insulation for the heat-resistant or fire-resistant lining of the melting chamber.

In accordance with the embodiment of the invention presently under consideration, melting of the charge from below may be effected with a substantially ring-shaped or annular electric arc which preferably has a cutting-torch like configuration. When using an annular arc, a downwardly extending projection is formed in a center region of the leading end of the column and this may bear against the bottom of the melting chamber to support the column. Thus, the column may be supported at a center region of the chamber. This is in constrast to the embodiment illustrated in FIG. 1 where the column supports itself at the periphery of the melting chamber. However, in similarity with the previously described embodiment, the annular arc may simultaneously serve for superheating the molten material by suitable positioning thereof above the molten material which flows off. Such superheating is advantageous when, for example, the molten material is to be conveyed from the melting chamber to a converter, a Siemens-Martin oven or the like.

Advantageously, the ratio of the cross-section of the column of charge to the cross-section of the supporting projection formed by the melting operation is maintained of such large magnitude that heat transfer through the column of charge only insignificantly influences superheating of the molten material which flows off. In general, since the molten material will normally flow to the bottom of the melting chamber so that the projection formed in the leading end of the column and which bears against the bottom of the chamber will be in contact therewith, it is of advantage when at least the part of the projection which contacts the molten material is maintained of such small dimensions that substantial heat transfer from the molten material to the column is prevented.

In order to reduce the liquidus temperature of the molten material, the invention contemplates, in one of its aspects, for carburizing the molten material at the bottom of the melting chamber, for instance, by blowing in coal or the like. In this manner, a greater degree of superheating of the molten material may be achieved. It is also possible to provide additional means for superheating the molten material. Such means may be in the form of an induction coil or the like provided in the bottom of the melting chamber or in the form of an electric arc which is specifically directed at the molten material. Such an arc may be generated in various ways. Thus, it is possible to provide an electrode or electrodes which are used in the melting operation and which generate a cutting torch-like or plate-shaped arc having a downwardly directed arc portion. On the other hand, it is also possible to provide an electrode or electrodes which are in addition to those used for the melting operation and which generate an arc directed onto the molten material.

Another feature of the embodiment of the invention presently under consideration resides in an arrangement for melting a charge which includes electric arc generating means arranged to melt the leading end of a column of charge in such a manner as to form in the leading end a downwardly projecting portion located at least in part within the confines of the periphery of the leading end. As in the embodiment illustrated in FIG. 1, the melting chamber may be provided with an outlet or opening in the region of the bottom thereof for outflow or withdrawal of the molten material and, again, means may be provided for temporarily retaining the molten material produced by the melting operation in the chamber, that is, for permitting a short dwell time of the molten material in the chamber between melting and outflow. The latter means may, as before, be in the form of a raised outlet at the bottom of the melting chamber, that is, the melting chamber may be provided with an upwardly extending projection at the bottom thereof in the region of the opening through which the molten material flows out of the chamber. The electric arc generating means may include means for producing a substantially ring-shaped or annular arc, preferably one having a cutting torch-like configuration.

By virtue of the dwell time which may be provided for the molten material in the chamber, there may again result a superheating of the molten material by the annular arc located above the latter which, as already indicated, may be favorable for further processing of the molten material.

The annular electric arc may be generated by a plurality of electrodes distributed along the circumference of the melting chamber in the vicinity of the bottom thereof. It is advantageous when the electrodes are inclined towards the bottom of the melting chamber since, in this manner, it becomes possible to prevent escape of the molten material from the chamber through the slits or passages defined between the electrodes and the wall of the melting chamber.

The electrodes may be constructed in such a manner as to permit different sections or segments of the leading end of the column to be differently impinged by the arc, that is, as to permit an individual adjustment of the heat supplied to various sections of the leading end. This is of advantage when, as a result of a non-uniform distribution of the charge, or in cases where non-uniform melting rates are used, certain regions are to be differently impinged. In a similar manner, by changing the direction and configuration of the arc, it becomes possible to cover regions where slower melting deposits have formed. This may also be effective for maintaining the continuity of the operation in that changes in the melting profile may be produced hereby. Moreover, a suitable configuration for the shape of the arc may be utilized for superheating of the molten material.

In general, the electrodes may be constructed in such a manner as to be adjustable for changing the heat output and/or the direction and/or the configuration and/or the dimensions of the arc. The different electrodes may be independently adjustable.

Where several individual electrodes are used, the impingement of the arc should preferably not, however, lead to the formation of individual, disconnected, cavern-like cavities in the leading end of the column. The electrodes are preferably so adjusted that, in every case, a substantially disc-shaped total surface is produced which, to the inner region of the leading end where the supporting projection is located, does not exhibit any dead, that is, unmelted, areas which may prevent an unhindered, uniform sinking or descent of the column of charge in the melting chamber.

A peripheral arrangement of the electrode system, that is, an arrangement where the electrodes are positioned at the circumference or periphery of the melting chamber, favorably simplifies attendance to and immediate observation of defects. The individual electrodes may burn in a sense directing the individual arcs generated thereby directly towards the axis of the melting chamber or may also burn in a sense directing the individual arcs generated thereby in a direction which is more tangential to the wall of the chamber. It is also possible to provide combination electrode systems such as, for example, a combination of a peripheral electrode system with an electrode which extends into the melting chamber through the bottom thereof (the latter, for instance, as illustrated in FIG. 1). In such an event, the downwardly extending projection formed in the leading end of the column and which supports the latter may be of substantially ring-shaped or annular configuration as opposed to the case where only a peripheral electrode system is used and where the projection may have a solid, substantially circular cross-section. When using a combination such as described, the electrode which extends into the melting chamber through the bottom thereof is preferably positioned in a line with or on the longitudinal axis of the melting chamber and advantageously generates an arc of substantially plate-shaped configuration which is substantially centered with respect to the cross-section of the melting chamber or of the column.

FIGS. 2 and 3 illustrate the embodiment of the invention wherein a peripheral arrangement of the electrodes is used. The same reference numbers as in FIG. 1, but with primes, have been used here to designate similar components. Only a lower part of the melting arrangement has been shown in FIG. 2 since the primary difference in constructional details between the embodiment of FIG. 1 and that of FIGS. 2 and 3 resides in such lower part and the embodiments of FIG. 1 and FIGS. 2 and 3 may otherwise be the same. Similarly, the operational details for the two embodiments may also be the same.

As best seen from FIG. 3, a plurality of electrodes 5', in the present instance three, is arranged about the circumference of the melting chamber 16'. The electrodes 5' are inclined towards the bottom of the melting chamber 16' and together generate a substantially annular electric arc made up of the individual arcs 7' and having a cutting torch-like configuration. The arc is directed at the column or stack 29' from below the latter and melts the lower or leading end of the stack 29'. Due to the action of the arc, a rotational symmetric, disc-shaped cavity is produced in the leading end of the column 29' with the concomitant formation of a downwardly extending projection P in the leading end. It may be seen that the projection P formed in the leading end of the stack 29' is located within the confines of the periphery of the leading end and, in the illustrated embodiment, is located in a center region of the leading end. In the present instance, the projection P has an approximately solid circular configuration. However, as indicated earlier, it is possible to combine the peripheral electrode arrangement shown with an electrode which extends into the melting chamber 16' through the bottom thereof and, in such an event, the projection P may have a substantially annular configuration while still being located within the confines of the periphery of the leading end of the stack 29'.

The projection P bears against the bottom of the chamber 16' thereby supporting the stack 29'. In this connection, it should be mentioned that the more heavily backened region of the stack 29' indicates a region thereof where the individual particles of the charge have welded to one another by virtue of the heat generated by the electric arc. This results in the formation of a supporting arch, as in the embodiment of FIG. 1, on which the charge above the leading end of the stack 29' rests.

As the leading end of the stack 29' melts, fresh charge moves downwardly in the chamber 16' to become exposed to the action of the electric arc. The molten material produced by the melting operation flows downwardly in the chamber 16' to the collecting space 13' to form a pool in the latter and thereafter flows out of the chamber 16' via the outlet passage 21' and into the receiving vessel which has not been illustrated here. It is of advantage, as pointed out previously, for the electric arc to be positioned far enough above the bottom of the chamber 16' so as to permit the molten material which flows off to form a thermal barrier for the fire-resistant or heat-resistant lining in the bottom region of the chamber 16'.

As in the embodiment of FIG. 1, the projection 12' which extends upwardly from the bottom of the chamber 16' has the effect of temporarily retaining the molten material on the bottom of the chamber 16', that is, the projection 12' has the effect that the molten material is not able to flow off through the outlet passage 21' immediately upon reaching the bottom of the chamber 16' but remains at the bottom of the chamber 16' for a certain period of time. This permits the molten material to become superheated by the electric arc. It is advantageous, as indicated earlier, for the dimensions of the projection P to be maintained of such small magnitude that heat transfer from the molten material into the stack 29' only insignificantly influence the superheating of the molten material.

A passage 6' may be defined between each of the electrodes 5' and the wall 1' of the chamber 16'. Through the passages 6', which are preferably of annular configuration, reducing gas such as methane or the like may be introduced into the chamber 16'. Waste gases may be exhausted from the chamber 16' via a non-illustrated exhaust conduit which may be provided in the region of the upper end of the chamber 16'.

It will be understood that each of the elements described above, or two or more together, may also find a useful application in other types of melting methods and arrangements differing from the types described above.

While the invention has been illustrated and described as embodied in a method and arrangement for melting charges, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims are:

1. A melting method, comprising admitting a charge into a substantially vertically arranged melting zone having a substantially vertically extending central region so as to form a column of said charge in said zone; and melting said charge in a lower region of said zone with electric arc means directed at a lower portion of said column from at least one location which is spaced from said central region of said zone.

2. A method as defined in claim 1, wherein the molten material produced by said melting is superheated in said zone.

3. A method as defined in claim 2, wherein said electric arc means melts said lower portion and simultaneously superheats said molten material.

4. A method as defined in claim 1, wherein said charge is reduced prior to said melting.

5. A method as defined in claim 4, wherein said reduction is effected by introducing a reducing gas into said zone.

6. A method as defined in claim 1, wherein said electric arc means is of substantially annular configuration.

7. A method as defined in claim 1, wherein said electric arc means is of substantially cutting torch-like configuration.

8. A method as defined in claim 1, wherein said electric arc means extends across a major part of the cross-section of said lower portion.

9. A method as defined in claim 1, said zone having a fire-resistant bottom region, and the molten material produced by said melting flowing towards said bottom region; and wherein said electric arc means is positioned at a sufficient distance above said bottom region as to permit said molten material to form a thermal barrier for said bottom region.

10. A method as defined in claim 1, wherein said zone has an at least approximately constant cross-section.

11. A method as defined in claim 1, wherein the molten material produced by said melting is carburized.

12. A method as defined in claim 11, said molten material flowing to a bottom region of said zone; and wherein said carburization is performed at said bottom region.

13. A melting arrangement, comprising means defining a substantially vertically arranged melting chamber having a substantially vertically extending central region; and electrode means for melting a charge in a lower region of said chamber, said electrode means having at least one electric arc-generating end which faces said lower region of said chamber and is spaced from said central region of said chamber.

14. A melting arrangement, comprising means defining a substantially vertically arranged melting chamber; and electrode means for melting a charge in a lower region of said chamber, said electrode means being arranged so as to generate electric arc means of substantially annular configuration in said lower region of said chamber.

15. An arrangement as defined in claim 14, wherein said electrode means is arranged so as to generate electric arc means of substantially cutting torchlike configuration.

16. An arrangement as defined in claim 15, comprising means for temporarily retaining the molten material produced by melting of said charge in said chamber so as to permit superheating of said molten material in said chamber, and means for the substantially continuous evacuation of the superheated molten material from said chamber during melting of said charge.

17. An arrangement as defined in claim 13, wherein said chamber has a bottom and is provided with an opening for the outflow of the molten material produced by melting of said charge, said opening being upwardly spaced from said bottom so as to permit said molten material to be temporarily retained in said chamber.

18. An arrangement as defined in claim 13, wherein said electrode means is operative for generating electric arc means of substantially annular configuration.

19. An arrangement as defined in claim 18, wherein said electrode means comprises a plurality of spaced electrodes arranged circumferentially of said chamber for generating said electric arc means of substantially annular configuration.

20. An arrangement as defined in claim 13, said chamber having a bottom; and wherein at least one of said electrodes is inclined towards said bottom.

21. An arrangement as defined in claim 13, wherein said electrodes are operative for generating electric arc means of substantially cutting torch-like configuration.

22. An arrangement as defined in claim 13, said chamber having a substantially vertically extending axis; and wherein said electrode means comprises an electrode positioned substantially on said axis.

23. An arrangement as defined in claim 13, wherein said electrode means comprises at least one adjustable electrode.

24. An arrangement as defined in claim 23, wherein said one electrode is adjustable in a sense changing the direction of the arc generated thereby.

25. An arrangement as defined in claim 23, wherein said one electrode is adjustable in a sense changing the configuration of the arc generated thereby.

26. An arrangement as defined in claim 23, wherein said one electrode is adjustable in a sense changing the dimensions of the arc generated thereby.

27. An arrangement as defined in claim 23, wherein said one electrode is adjustable in a sense changing the heat output of the arc generated thereby.

28. An arrangement as defined in claim 13, wherein said electrode means comprises a plurality of independently adjustable electrodes.

29. An arrangement as defined in claim 13, wherein said chamber has an at least approximately constant cross-section.

30. A method as defined in claim 1, wherein said electric arc means comprises a plurality of electric arcs which are spaced in circumferential direction of said zone.

31. A method as defined in claim 1, wherein said charge comprises at least one member of the group consisting of scrap, ore, pellets and sinter.

32. A method as defined in claim 1, said zone having a peripheral region and a bottom; and wherein said melting is performed in such a manner as to form at said lower portion of said column a projection which is located substantially entirely within said peripheral region of said zone and which bears against said bottom to support said column in said zone.

33. A method as defined in claim 32, said column being of at least approximately constant cross-sectional area above said lower portion thereof; and wherein the molten material produced by said melting flows to said bottom of said zone and is superheated in said zone, said melting being effected so as to maintain the ratio of said cross-sectional area to the cross-sectional area of said projection of such large magnitude that the heat flow from said molten material to said column only insignificantly influence said superheating.

34. A method as defined in claim 32, wherein the molten material produced by said melting flows to said bottom of said zone and part of said projection contacts said molten material at said bottom of said zone, said melting being effected so as to maintain the dimensions of said part of such small magnitude that substantial heat transfer from said molten material to said column is prevented.

35. A melting method, comprising admitting a charge into a substantially vertically arranged melting zone so as to form a column of said charge in said zone; and melting said charge in a lower region of said zone with electric arc means of substantially annular configuration which is directed at a lower portion of said column.

36. A method as defined in claim 35, wherein said electric arc means is of substantially cutting torch-like configuration.

37. A method as defined in claim 36, said charge being admitted into an upper region of said zone and descending by gravity from said upper region to said lower region of said zone; and wherein the molten material produced by said melting is superheated using said electric arc means and the superheated molten material is substantially continuously evacuated from said zone during said melting.

* * * * *